United States Patent [19]

Braham

[11] Patent Number: 4,879,436

[45] Date of Patent: Nov. 7, 1989

[54] CLOSURE FOR TELECOMMUNICATIONS CABLE

[75] Inventor: R. Brian Braham, Saskatoon, Canada

[73] Assignee: Northern Telecom Limited, Montreal, Canada

[21] Appl. No.: 233,648

[22] Filed: Aug. 18, 1988

[51] Int. Cl.[4] .......................................... H02G 15/113
[52] U.S. Cl. .......................................... 174/92; 174/76
[58] Field of Search .................... 174/92, 76; 220/4 E

[56] References Cited

U.S. PATENT DOCUMENTS

| | | | | |
|---|---|---|---|---|
| 3,619,481 | 10/1969 | Smith | ................................. | 174/76 X |
| 3,715,459 | 2/1973 | Hoffman | ........................... | 174/76 X |
| 4,135,587 | 1/1979 | Diaz | ..................................... | 174/92 |
| 4,295,005 | 10/1981 | Daugherty et al. | .................. | 174/92 |

FOREIGN PATENT DOCUMENTS 28691  3/1976  Japan ..................................... 174/76

*Primary Examiner*—Morris H. Nimmo
*Attorney, Agent, or Firm*—R. J. Austin

[57] ABSTRACT

A closure structure for a telecommunications splice having two housing halves which, when joined together, provide a splice chamber surrounded by a space which is sealed with moisture blocking material. For this purpose, each housing half has two spaced-apart walls with the walls of the two halves coacting to provide the space upon assembly.

7 Claims, 2 Drawing Sheets

CLOSURE FOR TELECOMMUNICATIONS CABLE

This invention relates to closures for telecommunications cables.

In the telecommunications industry, cable lengths need to be spliced together either to provide a sufficiently long length of cable run between two points or to splice a branch cable into a main cable. In the telecommunications cable field, splices are provided both in greased filled and air pressurized cable. Splices are enshrouded by a closure to prevent degradation of the splices and of the conductors and cable in the immediate region at each side of the splice. In some telecommunications splice closures, encapsulant directly surrounds the splices and cable and a housing surrounds the encapsulant. In other closures, e.g. for connecting together optical fiber conductors of an optical cable, it is not desirable for encapsulant to contact the fibers or splice regions directly. In such closures, a dual closure structure may be used in which separate inner and outer closure housings are provided with moisture blocking encapsulant disposed between them. The inner closure surrounds, but is spaced from, the splices and conductors in the splice regions.

The present invention seeks to provide a simplified closure structure which in use provides the same sealing advantages as the conventional dual closure structure.

According to the present invention, a closure structure is provided for a telecommunications cable splice comprising two housing parts which are sealingly connectable together, the housing parts having walls which, when the parts are connected together, provide a splice chamber within the structure and a space around the splice chamber which is separated from the splice chamber by an inner wall, the space disposed between closing together regions of the housing parts for containing a moisture blocking material and the housing parts defining recesses which coact in the assembly to provide cable entrance openings into the chamber.

More particularly the present invention provides a closure structure for a telecommunications cable splice comprising two housing parts each having an inner wall defining an inner chamber which is open at one side of the housing part and an outer wall spaced outwardly from the inner wall and away from the inner chamber to define an outer chamber between the inner and outer walls, the housing parts being securely connectable one to the other, the housing parts defining recesses in the walls which coact in the assembly to provide cable entrance openings into the chamber and, in the assembled condition of the housing parts, the inner walls seal against one another to connect the inner chambers to define a boundary for the splice chamber and the outer walls seal against one another to connect the outer chambers to define a sealant chamber in the space between the inner and outer walls for containing moisture blocking material.

With the structures according to the invention, the space for the sealant chamber that is provided between the housing parts may merely be sufficient to lie between the sealed together inner walls and the sealed together outer walls of the housing parts so that when moisture blocking material is disposed within this space it prevents the ingress of moisture from the surrounding environment. As can be seen, the water blocking material is thus localized in the region immediately adjacent to the sealed inner and outer walls instead of extending completely around an inner housing as in conventional arrangements. Further to this, the present invention avoids the use of two complete housings, i.e. one inside the other, in which four housing parts are normally used.

One embodiment of the invention will now be described, by way of example, with reference to the accompanying drawings, in which.

Figure 1:
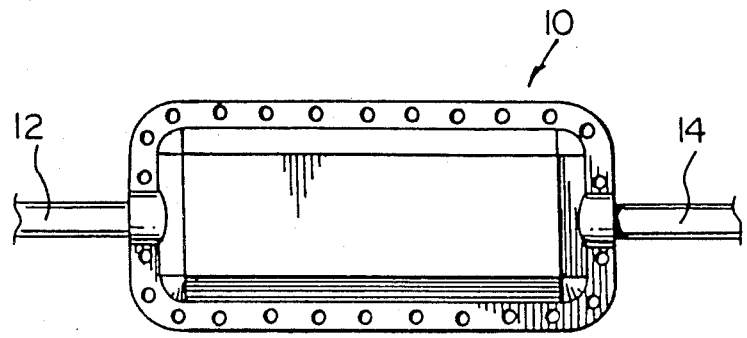
FIG. 1 is a plan view of a closure structure according to the embodiment shown in assembled form around a cable splice.

As shown in FIG. 1, a closure structure 10 according to the embodiment is shown in assembled condition surrounding a splice between two cables 12 and 14 issuing from either end of the structure.

Figure 2:
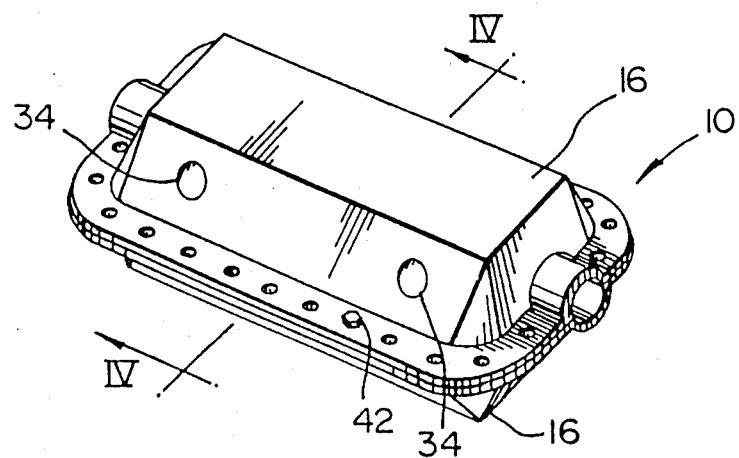
FIG. 2 is an isometric view of the closure structure of FIG. 1.
Figure 3:
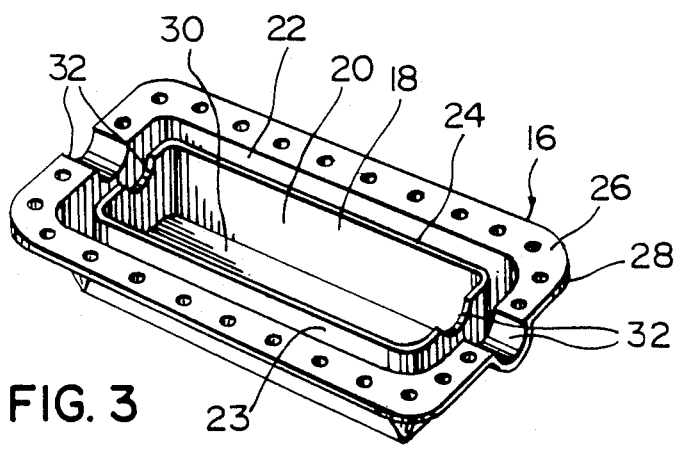
FIG. 3 is an isometric view of a lower housing part of the closure structure of FIG. 2.
Figure 4:
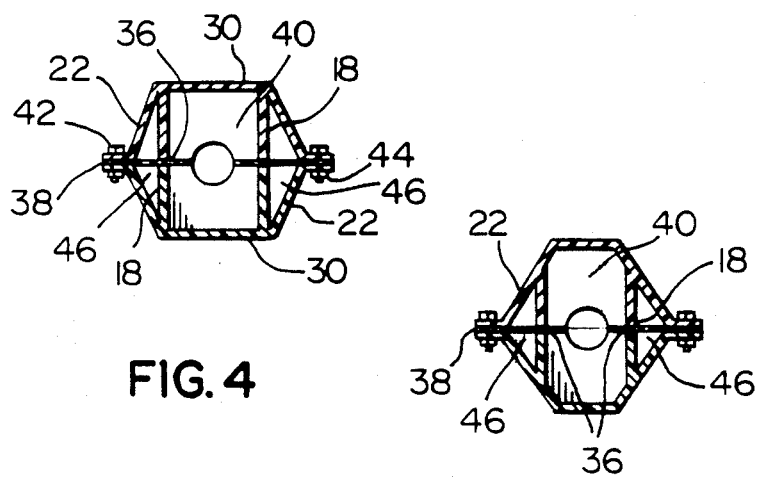
FIG. 4 is a cross-sectional view through the structure taken along line IV—IV in FIG. 2.
Figure 5:
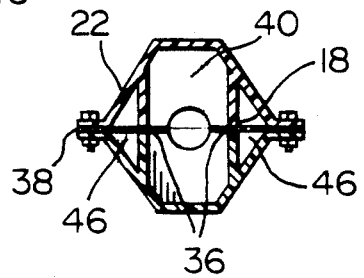
FIG. 5 is a view similar to FIG. 4 of a modification of the embodiment.

As is more clerly shown in FIGS. 2 and 3, the structure 10 comprises two identical housing parts 16. Each housing part 16 has an inner wall 18 which surrounds an inner chamber 20, which is open at a free end of the wall and an outer wall 22. The outer wall has a free end which is spaced outwardly from the inner wall which it surrounds and also away from the inner chamber 20, so as to define an outer chamber 23 between the two walls, as can be seen from FIG. 3. The inner and outer walls have coplanar free end surfaces 24 and 26 respectively, the surface 26 of the outer wall being formed by an outwardly projecting flange 28. Each housing part 16 is integrally molded from suitable plastic material with the walls 18 and 22 integral with a base 30 from which both of the walls extend as shown in FIG. 4. The inner wall 18 may extend from the junction region of the base with the outer wall 22 as shown by FIG. 4 or, alternatively, may extend from the wall 22 itself as shown in the modification in FIG. 5. Alternatively, the inner wall may extend from the base in a position spaced from the junction of the base with the outer wall. This modification is not shown in the drawings. As can be seen clearly from FIGS. 4 and 5, the walls diverge so that they are spaced apart.

Each housing part has opposite ends at which each or the walls 18 and 22 defines semi-circular recesses 32 for the passage of cable in sealing engagement with the housing parts. Elastomeric seals (not shown) may be disposed around the recesses to assist in sealing against the surface of a cable jacket.

One of both of the housing parts 16 (FIG. 1) is formed with locally thinner wall portions 34 in the outer walls 16, these thinner wall portions being removable for a purpose to be described.

In use, after a splice or splices have been made between the two cables 12 and 14, the two housing parts are assembled around the cable with sealing gaskets 36 and 38 disposed between opposing inner and outer walls 18 and 22. In addition, the recesses 32 coact from one housing part to another for sealing around each cable as it passes through the ends of the housing parts and into the splice chamber 40 formed between them (see FIG. 4). The housing parts are then secured together by any suitable means, such as bolts 42 passing through aligned holes in the flanges 28 and securing nuts 44 received by the bolts.

After the housing parts are secured together with the seals 36 and 38 sealing between the walls 18 and 22, the thinner regions 34 of the walls 22 are removed and a suitable moisture blocking material is forced into the sealant chamber 46 which is defined by and enclosed by the walls 18 and 22. As will be readily apparent by considering FIGS. 3 and 4, the sealant chamber 46 not only extends along the length of the assembly, but also between the walls 18 and 22 at the ends so as to be disposed between adjacent recesses 32 of the walls. A suitable moisture blocking material is any commercially available viscous encapsulant material which is at present used for encapsulation purposes in dual closure structures for cable splices such as a bitumastic or plastic type encapsulant which solidifies in situ.

Hence, the embodiment shows that the invention is concerned with a structure which only includes two housing parts while nevertheless providing the sealing advantages normally provided by a dual closure structure of separate housings each having two housing parts. A seal is provided between the outer walls 22 by the gasket 38 and also between the walls 18 by the gasket 36. In addition, an extra seal is provided in the region between the two gaskets 36 and 38 by the encapsulant material occupying the sealant chamber 46. It will be readily apparent that the housing parts are easy and economical to manufacture by simple molding processes, especially where these parts are identical as in the embodiment described. Also, the amount of encapsulant material required for the sealant chamber 46 is minimized because the sealant chamber 46 is localized towards and into the region between the two gaskets 36 and 38 while providing the desirable sealing effect which is normally associated with conventional dual closure structures.

What is claimed is:

1. A closure structure for a telecommunications cable splice comprising two housing parts which are sealably connectable together, each housing part:
   having a base;
   a continuous outer wall extending from one side of the base to a free end of the outer wall; an inner wall disposed within the outer wall, the inner wall extending in a direction away from the base to a free end of the inner wall spaced inwardly from the free end of the outer wall; the inner wall providing a boundary for an inner chamber which is open at the free end of the inner wall, the base also forming a part of the said boundary;
   the inner and outer walls also forming boundaries for an outer chamber which is open between the free ends of the inner and outer walls; and the free ends of the two walls defining recesses for receiving cables through the structure across the outer chamber and into the inner chamber; the two housing parts being securely connectable one to the other so that, except at the recesses in the free ends, the free ends of the inner walls of the two housing parts seal together to connect the inner chambers to define a splice chamber and the free ends of the outer walls of the two housing parts seal together to connect the outer chambers to define a sealant chamber for containing moisture blocking material, the recesses in the free end surfaces of the walls coacting in the assembly to provide cable entrance openings into the splice chamber through the sealant chamber.

2. A closure structure according to claim 1 wherein the two housing parts are identical in size and shape.

3. A closure structure according to claim 1 wherein each housing part is integrally formed as a single plastic molding.

4. A closure structure according to claim 2 wherein each housing part is integrally formed as a single plastic molding.

5. A closure structure according to claim 1 which comprises elastomeric sealing gaskets for location between the free ends of the walls.

6. A closure structure and cable splice assembly comprising: a closure structure in which
   (a) the closure structure has two housing parts sealingly connected together, the two housing parts each having a base, an outer wall and an inner wall, each wall extending to a free end, and in the closure structure, cable entrance openings are defined between free ends of the outer walls of the housing parts and between free ends of the inner walls of the housing parts, and between the cable entrance openings the free end of each wall of one housing part is sealingly connected to the free end of the corresponding wall of the outer housing part;
   (b) the inner walls define part of a boundary of a splice chamber, part of the said boundary also defined by the bases; and
   (c) the inner and outer walls define boundaries of a sealant chamber sealingly separated from the splice chamber and sealingly separated from the outside environment, said sealant chamber containing moisture blocking material; and cables each extending sealingly through cable entrance openings of inner and outer walls to be sealingly engaged by the moisture blocking material in the sealant chamber, the cables extending into the splice chamber with splices formed between conductors of one cable and conductors of the other cable in the splice chamber.

7. A splice enclosure according to claim 6 wherein the two housing parts are sealingly connected with elastomeric sealing gaskets disposed between the corresponding walls of the two housing parts and around the cable entrance openings so as to seal against the cables extending through the openings.

* * * * *